United States Patent Office 3,401,146
Patented Sept. 10, 1968

3,401,146
HARDENABLE AND CURED EPOXY
RESIN COMPOSITIONS
Marwan R. Kamal, John R. Nazy, and Harold A. Wittcoff,
Minneapolis, Minn., assignors to General Mills, Inc., a
corporation of Delaware
No Drawing. Filed Oct. 24, 1966, Ser. No. 588,738
17 Claims. (Cl. 260—47)

The present invention relates to novel compositions comprising proxy resins and certain derivatives of polyamines containing both primary and secondary amine groups. More particularly, it relates to hardenable compositions comprising epoxy resins and derivatives of carboxylic acids (or the anhydrides, acid halides or esters thereof) and certain polyamine compounds in which the primary amine groups are blocked by ketimine groups. It also relates to the infusible, insoluble polymers prepared from such hardenable compositions.

Epoxy resins are known to produce a number of valuable products when reacted or cured with a variety of so-called curing agents. The properties of the resulting infusible, insoluble products depend not only on the particular epoxy resin employed but also on the curing agent used. Thus there has been a constant and continuing search for new epoxy resins and for new curing agents in order to provide hardenable compositions and infusible, insoluble products derived therefrom exhibiting improved properties.

Epoxy resins have been known and used commercially for some time, and many of these resins have been described in substantial detail in numerous publications and patents. For example, epoxy resins are described in substantial detail in such recently issued United States patents as Nos. 2,923,696, 3,026,285, 3,067,170, 3,072,606, 3,072,607, 3,073,799, 3,079,367, 3,080,341, and 3,084,139, each of which patents is included herein by reference as disclosing typical epoxy resins which are used in the practice of the instant invention.

Most of the known curing agents for epoxy resins leave something to be desired. Thus some of such materials react too rapidly and therefore have such a short "pot life" that the handling of the opoxy resin: curing agent system is considerably complicated. In the case of other curing agents, such compounds tend to cure the epoxy resins with objectionable results which include undesirably slow curing, low impact resistance in the cured resin and/or brittleness in the cured resin. The so-called "pot life" is important in that it represents the time that is allowed for the handling of the resin after the incorporation of the curing agent and before curing to such an extent that the resin can no longer be filmed, coated or otherwise manipulated in the manner desired prior to curing.

The chemistry of epoxy resins has been studied extensively. The epoxy resins contain the characteristic functional epoxy group, i.e.,

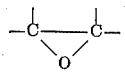

which characteristic functional group is understood to undergo the following cross-linking reactions when a primary amine group containing compound is used as a curing agent:

(1) 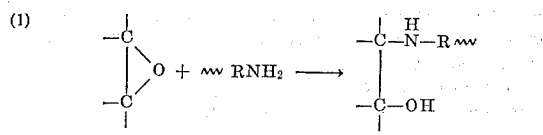

(2) 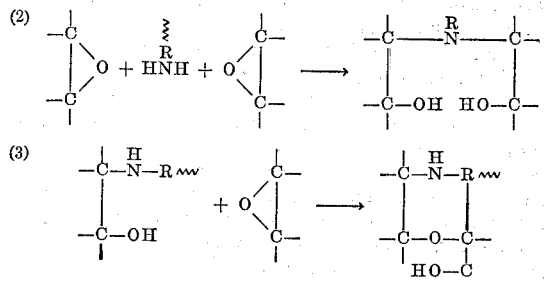

(3) 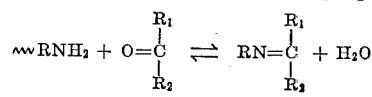

Under normal conditions, the two amine-epoxy reactions, i.e., (1) and (2), predominate and proceed at approximately equal rates. The use of simple polyamines containing primary amine groups, as cross-linking agents for the epoxy resins, ordinarily results in far too short a "pot life," among other undesirable results.

It has been suggested that the primary amine groups of polyamines could be blocked by ketimine groups. The reaction of a primary amine and a ketone is understood to proceed in accordance with the following equation:

(4)
$$\sim\!\!\sim\!\!RNH_2 + O\!=\!\underset{R_2}{\overset{R_1}{C}} \rightleftarrows RN\!=\!\underset{R_2}{\overset{R_1}{C}} + H_2O$$

The foregoing reaction is, of course, reversible and the resulting complex will thus react in the presence of moisture to produce the primary amine again. The initial reaction to form the complex is carried out under conditions effecting the removal of water.

Blocking of the primary amine groups of polyamines with ketimine groups leads to curing agents yielding hardenable compositions with epoxy resins having an increased "pot life." However, if the starting polyamine has secondary amine groups, the pot life of the resulting hardenable composition may still bee too short. In addition, the properties of the resulting infusible, insoluble product are substantially the same as obtained by the use of the polyamine per se.

One object of the present invention is to provide novel hardenable compositions comprising epoxy resins and certain derivatives of polyamines containing both primary and secondary amine groups. Another object of our invention is to provide such hardenable compositions comprising epoxy resins and derivatives of carboxylic acid compounds and secondary amine group containing polyamines in which the primary amine groups are blocked by ketimine groups. A further object of the invention is to provide infusible, insoluble resinous products prepared from such hardenable compositions. These and other objects will become apparent from the following detailed description.

In general, the instant invention consists in new hardenable or curable compositions comprising an epoxy resin and a derivative of a carboxylic acid (or the anhydrides, acid halides or esters thereof) and a secondary amine group containing polyamine in which the primary amine groups are blocked by ketimine groups. The present invention further consists in infusible, insoluble resinous products or polymers prepared from such hardenable compositions. Our new hardenable compositions have an extended pot life and yet can be cured in a relatively short period of time in the presence of moisture to yield infusible, insoluble resinous products having highly desirable properties. Our invention allows the tailoring of the properties of the cured products due to the introduction of groups derived from the carboxylic acid compounds when the same are reacted with the ketimine blocked polyamines containing at least one free secondary amine group.

The derivatives employed in combination with the epoxy resins in accordance with the present invention are prepared from carboxylic acid compounds and ketimine blocked polyamines which contain at least one free secondary amine group. Any polyamine having at least one secondary amine group may be used in the preparation of the derivatives. Preferred polyamines are the alkylene polyamines and the substituted alkylene polyamines. Especially preferred polyamines are selected from those having the following formula:

$$H_2N(RNH)_nRNH_2$$

where R is a difunctional aliphatic group containing from 2 to about 48 carbon atoms and $n$ is an integer of 1 to about 20. R may represent the same or different radicals in any one polyamine compound. Where the polyamines contain two or more secondary amine groups, one or more of said groups may have the hydrogen replaced by an aliphatic group, i.e., methyl, propyl, butyl, decyl, hexadecyl, hexenyl, octenyl, tridecenyl, octadecyl, undecynyl and the like. Inert or noninterferring groups such as Cl, nitro and the like may be present on the group R or the described substituent replacing the hydrogen of one or more secondary amine groups. The polyamines must contain at least one free secondary amine group, $$\overset{H}{\underset{|}{-N-}}$$

prior to the preparation of the derivatives of our invention.

Particularly preferred polyamines are those having the formula as set forth above wherein R is an aliphatic hydrocarbon group and $n$ is an integer of 1 to 3. It is still more preferred that R is an alkylene group of 2–6 carbon atoms.

Typical of the amines which may be used are diethylene triamine, triethylene tetramine, etc., and the corresponding propylene, butylene, etc., amines.

The primary amine groups in the polyamine compounds are converted to ketimines by reaction with ketones. Such ketones may have the following structural formula:

$$O=C\diagup^{R_1}_{\diagdown R_2}$$

wherein $R_1$ and $R_2$ are organic radicals and are each substantially inert to the ketimine formation reaction. Preferably $R_1$ and $R_2$ are short chain alkyl groups (1 to 4 carbon atoms). Preferred compounds are low molecular weight ketones that are volatile so that an unreacted excess thereof may easily be removed by conventional distillation practices when the reaction is completed. Such volatile compounds are also preferred so that when the derivatives are mixed with epoxy resins and exposed to water—i.e., moisture, the freed ketone can be easily removed from the reaction mixture. It is often preferred to use a ketone which boils below or near the boiling point of water or which readily distills with water. The reaction of the ketone with the primary amine groups can be illustrated as follows:

$$\text{ww-}NH_2 + O=C\diagup^{R_1}_{\diagdown R_2} \xrightarrow{\Delta} \text{ww-}N=C\diagup^{R_1}_{\diagdown R_2} + H_2O\uparrow$$

Preferred examples of ketones include acetone, methyl ethyl ketone, diethyl ketone, methyl propyl ketone, methyl isopropyl ketone, methyl-n-butyl ketone, methyl isobutyl ketone, ethyl isopropyl ketone, cyclohexanone, cyclopentanone, acetophenone, propiophenone, and the like. Especially preferred ketones are acetone, methyl ethyl ketone and methyl isobutyl ketone.

The derivatives are prepared from the polyamine compounds having at least one free secondary amine group and having the primary amine groups thereof blocked with ketimine groups by reacting same with a carboxylic acid compound under amide forming conditions. Thus the free secondary amine groups are converted to amide groups.

Any mono, di or higher carboxylic acid can be used in the preparation of the derivatives of the invention. Such acids preferably contain from 1 to about 40 carbon atoms. Representative monocarboxylic acids are formic, acetic, lactic, propionic, butyric, benzoic, valeric, caproic, enanthylic, caprylic, pelargonic, capric, undecylic, lauric, tridecoic, myristic, pentadecanoic, palmitic, margaric, stearic, nondecylic, arachidic, behenic, carnaubic, hyenic, carboceric, cerotic, lacceroic, melissic, montanic, psyllic, acrylic, crotonic, isocrotonic, vinylacetic, methacrylic, tiglic, angelic, senecioic, hexenic, teracrylic, hypogeic, oleic, elaidic, erucic, brassidic, sorbic, linoleic, linolenic, propiolic, tetrolic, pentinoic, amylpropiolic, palmitolic, stearolic, behenolic, cinnamic, and the like. Representative dicarboxylic and higher acids are adipic, citraconic, fumaric, glutaric, maleic, malic, malonic, oxalic, salicylic, succinic, tartaric, phthalic, sebacic, suberic azelaic, terephthalic, pimelic, isophthalic, polymeric fat acids and the like. It is, of course, to be understood that in addition to the carboxylic acids referred to, other saturated or unsaturated carboxylic acids having straight or branched chains may be used, as well as acids having various substituents such as Cl, nitro, hydroxyl and the like. Also the corresponding acid chlorides, anhydrides and esters of the said carboxylic acids may be employed. Preferably the esters if used are prepared from alcohols containing less than about 8 carbon atoms—i.e., methyl, ethyl, propyl and the like.

One especially preferred group of carboxylic acids to be employed in preparing the derivatives are the polymeric fat acids. The term "polymeric fat acid" refers to a polymerized fat acid. The term "fat acid" as used herein refers to naturally occurring and synthetic monobasic aliphatic acids having hydrocarbon chains of 8–24 carbon atoms. The term "fat acids," therefore, includes saturated, ethylenically unsaturated and acetylenically unsaturated acids. "Polymeric fat radical" is generic to the divalent, trivalent and polyvalent hydrocarbon radicals of dimerized fat acids, trimerized fat acids and higher polymers of fat acids, respectively. These divalent and trivalent radicals are referred to herein as "dimeric fat radical" and "trimeric fat radical."

The saturated, ethylenically unsaturated, and acetylenically unsaturated fat acids are generally polymerized by somewhat different techniques, but because of the functional similarity of the polymerization products, they all are generally referred to as "polymeric fat acids."

Saturated fat acids are difficult to polymerize, but polymerization can be obtained at elevated temperatures with a peroxidic reagent such as di-t-butyl peroxide. Because of the low yields of polymeric products, these materials are not commercially significant. Suitable saturated fat acids include branched and straight chain acids such as caprylic acid, pelargonic acid, capric acid, lauric acid, myristic acid, palmitic acid, isopalmitic acid, stearic acid, arachidic acid, behenic acid and lignoceric acid.

The ethylenically unsaturated acids are much more readily polymerized. Catalytic or noncatalytic polymerization techniques can be employed. The noncatalytic polymerization generally requires a higher temperature. Suitable agents for the polymerization include acid or alkaline clays, di-t-butyl peroxide, boron trifluoride and other Lewis acids, anthraquinone, sulfur dioxide and the like. Suitable monomers include the branched and straight chain, poly- and monoethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisnic acid, scoliodonic acid and chaulmoogric acid.

Acetylenically unsaturated fat acids, such as isanic and isanolic acids, can also be polymerized to give polymeric acids which can be used. The acetylenically unsaturated acids occur only rarely in nature and are expensive to synthesize. Therefore, they are not currently of commercial significance.

Although any one of the above-described saturated, ethylenically unsaturated and acetylenically unsaturated fat acids may be used to prepare the polymeric fat acids, it is generally the practice in the art to polymerize mixtures of acids (or the simple aliphatic alcohol esters—i.e., the methyl esters) derived from the naturally occurring drying and semidrying oils. Suitable drying and semidrying oils include soybean, linseed, tall, tung, perilla, oiticia, cottonseed, corn, sunflower, dehydrated castor oil and the like. Also, the most readily available acids are oleic and linoleic and thus they are preferred starting materials for the preparation of the polymeric fat acids. Relatively pure dimerized fat acids can be obtained from mixtures containing monomer, the dimerized fat acids, trimerized fat acids and higher polymers by high vacuum distillation or solvent extraction. Any of the described unsaturated polymeric fat acids can be hydrogenated prior to the use thereof in preparing the derivatives.

The derivatives are prepared by heating a mixture of the ketimine blocked polyamine with the carboxylic acid compound to a temperature sufficiently high to form the amide linkage

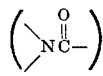

Thus, for example, when using a carboxylic acid, the mixture should preferably be heated to above 100° C. and more preferably to 120° C. and above. Temperatures of above about 300° C. should be avoided in most instances because of possible degradation of the resulting derivative. The reaction is also preferably carried out under conditions such that by-product water, HCl or alcohols formed during the reaction are removed from the reaction mixture—i.e., by distillation. And it is also preferred to carry out the reaction in the presence of a solvent. Such solvent should not react with either the carboxylic acid compound or the ketimine blocked polyamine. Hydrocarbon solvents such as benzene, toluene, xylene, cumene, ethylbenzene, heptane and the like are entirely suitable and preferred.

The carboxylic acid (or the anhydrides, acid chlorides or esters thereof) is used in an amount about equivalent to the equivalents of free secondary amine groups of the polyamine. In this respect, if the polyamine contains one free secondary amine group and the carboxylic acid is a monocarboxylic acid, one mole of the polyamine is reacted with one mole of the acid. If the polyamine contains two free secondary amine groups and the carboxylic acid is a monocarboxylic acid, one mole of the polyamine would be reached with two moles of the monocarboxylic acid. If the polyamine has one free secondary amine group and the carboxylic acid is a dicarboxylic acid, two moles of the polyamine would be reacted with one mole of the dicarboxylic acid. It is thus apparent that the ratio of reactants varies as to the number of free secondary amine groups of the polyamine— i.e., one, two, three or more— and as to whether the carboxylic acid compound is mono, di, tri or higher. An excess of either the ketimine blocked polyamine or the carboxylic acid compound can be used in the formation of the derivative. After completion of the reaction, the said excess can be removed from the derivative such as by distillation.

The derivatives are complex materials. In this respect they comprise a residue of a polyamine, 2 or more (preferably less than about 50) ketimine blocked primary amine groups and 1 or more (preferably less than about 50) amide groups derived from the secondary amine group or groups of the polyamine and the carboxylic acid compounds. In some of the preferred and simpler aspects, the derivatives can be defined structurally. Thus when the polyamine has only one free secondary amine group and the carboxylic acid compound is mono- or di-functional or when the polyamine has more than one free secondary amine group and the carboxylic acid compound is monofunctional, the derivatives can be defined by the following idealized, structural formulae:

(I) 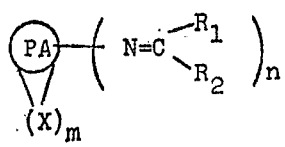

and (II) 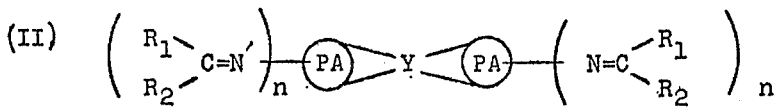

where $R_1$ and $R_2$ are as defined above, $n$ is an integer of at least 2, $m$ is an integer of at least 1,

is the residue of a polyamine exclusive of the ketimine blocked primary amine groups and the amide linked secondary amine nitrogen, $>X$ is

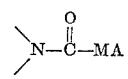

where MA is the residue of a monocarboxylic acid, and $>Y<$ is

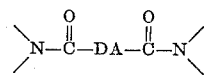

where DA is the residue of a dicarboxylic acid. Where the polyamine contains two or more secondary amine groups and the carboxylic acid compound is di, tri or higher functional, complex mixtures of derivatives tend to be produced. Such mixtures include polymers where three or more polyamine moieties are linked by three or more acid moieties. The derivatives also include mixtures wherein two or more different carboxylic acid polyamines are employed and/or two or more different compounds are employed.

The following examples illustrate the preparation of certain preferred derivatives and are not to be considered as limiting.

EXAMPLE A

A mixture of 146 g. (1.0 mole) adipic acid, 700 g. xylene and 540 g. (2.02 mole) of the diketimine made from diethylenetriamine and methyl isobutyl ketone was heated at reflux under a nitrogen atmosphere in a 2000 ml. round bottom flask equipped with a stirrer, reflux condenser and Barrett trap. The reaction mixture was refluxed for 20 hours during which time 41 ml. of water was removed by azeotropic distillation. At the end of the said reaction period (no more water being formed), the liquid portion of the reaction mixture was separated and stripped of solvent by heating under vacuum leaving 465 g. of residue. Unreacted diketimine was distilled from the residue to a pot temperature of 196° C. (at 0.7 mm. Hg) leaving 184 g. of derivative. The derivative had an amine number of 384 and its infrared spectrum taken in carbon tetrachloride showed bands at 6.0 and 6.16 microns characteristic of ketimines and disubstituted amides, respectively. The derivative had the following structure:

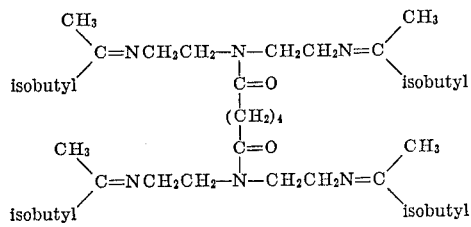

EXAMPLE B

A mixture of 588 g. (2.2 mole) diketimine (as used in Example A), 564.0 g. (1.0 mole) hydrogenated, distilled dimerized fat acid (percent dimer 93.5, percent monomer 5.5, percent trimer 1.0; Acid number 192.9; Iodine value 18.6) and 1000 g. xylene was charged to a 3000 ml. three necked, round bottom flask equipped with a nitrogen inlet, reflux condenser, Barrett trap and thermometer. The reaction mixture was refluxed at 140–145° C. for six hours during which period 64 g. water was removed by distillation. After the said reaction period (no more water being formed), excess xylene was stripped from the reaction product under vacuum. There was obtained 1007 g. of derivative having an amine number of 274.6. The derivative had the following structure:

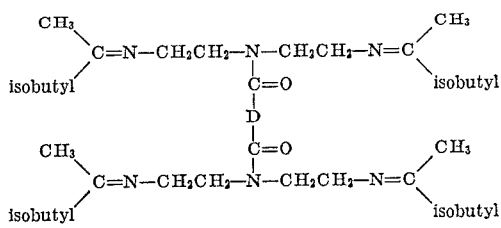

where D is the divalent hydrocarbon radical of the starting dimerized fat acid. Such dimerized fat acid was prepared by polymerizing the mixture of fat acids derived from tall oil and consisted mainly of a mixture of dimerized linoleic and oleic acids.

As set forth above the hardenable compositions comprise the described derivative and an epoxy resin. Any epoxy resin can be used in the practice of the present invention. Suitable resins include the reaction products of polyhdric phenols with polyfunctional halohydrins. Typical polyhydric phenols useful in the preparation of such resins include resorcinol and various bisphenols resulting from the condensation of phenol with aldehydes and ketones such as formaldehyde, acetaldehyde, acetone, methyl ethyl ketone, and the like. A typical epoxy resin of this type is the reaction product of epichlorohydrin and 2,2-bis(p-hydroxyphenyl)propane (Bisphenol A), the resin having the following thoretical structural formula:

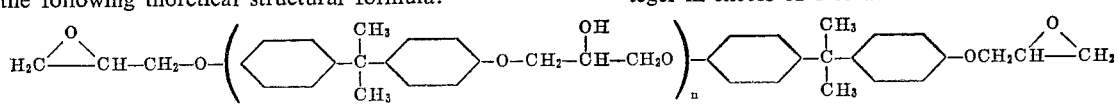

where $n$ is 0 or an integer up to 10. Generally speaking, $n$ will usually be no greater than 3 or 4, and may be 1 or less. However, other types of epoxy resins may be employed.

Another of such epoxy resins are those which are the reaction product of epichlorohydrin and bis(p-hydroxyphenyl)sulfone. Still another group of epoxy compounds which may be employed are the glycidyl esters of polymeric fat acids. These glycidyl esters are obtained by reacting the polymeric fat acids with polyfunctional halohydrins such as epichlorohydrins. In addition, the glycidyl esters are also commercially available epoxide materials. As the polymeric fat acids are composed largely of dimeric acids, the glycidyl esters thereof may be represented by the following theoretical, idealized formula:

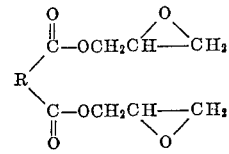

where R is the divalent hydrocarbon radical of dimerized unsaturated fatty acids.

Other types of epoxy resins which may be used with the derivatives in accordance with the present invention and which are commercially available epoxy materials are the polyglycidyl ethers of tetraphenols which have two hydroxy aryl groups at each end of an aliphatic chain. These polyglycidyl ethers are obtained by reacting the tetraphenols with polyfunctional halohydrins such as epichlorohydrin. The tetraphenols used in preparing the polyglycidyl ethers are a known class of compounds readily obtained by condensing the appropriate dialdehyde with the desired phenol. Typical tetraphenols useful in the preparation of these epoxy resins are the alpha, alpha, omega, omega - tetrakis(hydroxyphenyl)alkanes, such as 1,1,2,2 - tetrakis(hydroxyphenyl)ethane, 1,1,4,4-tetrakis(hydroxyphenyl)butane, 1,1,4,4-tetrakis(hydroxyphenyl)-2-ethylbutane and the like. The epoxy resin reaction product of epichlorohydrin and tetraphenol may be represented by the following theoretical structural formula:

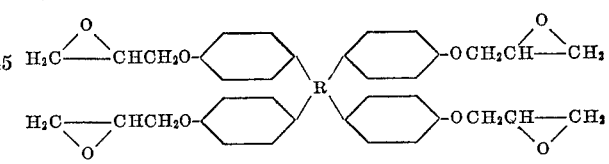

where R is a tetravalent aliphatic hydrocarbon chain having from 2 to 10, and preferably, from 2 to 6 carbon atoms.

Still another group of epoxide materials are the epoxidized novolac resins. Such resins are well known substances and readily available commercially. The resins may be represented by the following theoretical, idealized formula:

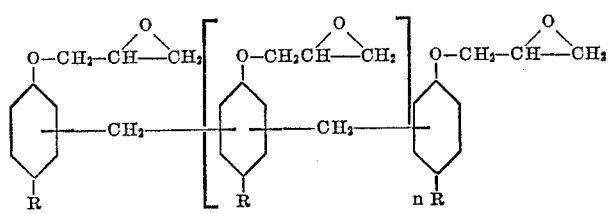

where R is selected from the group consisting of hydrogen and alkyl groups having up to 18 carbon atoms, and $n$ is an integer of from 1 to 10. Generally, $n$ will be an integer in excess of 1 to about 5.

In general, these resins are obtained by epoxidation of the well-known novolac resins. The novolac resins, as is known in the art, are produced by condensing the phenol with an aldehyde in the presence of an acid catalyst. Although novolac resins from other aldehydes such as, for example, acetaldehyde, chloral, butyraldehyde, furfural, and the like, may also be used. The alkyl group, if present, may have a straight or a branched chain. Illustrative of the alkylphenol from which the novolac resins may be derived are cresol, butylphenol, tertiary butylphenol, tertiary amylphenol, hexylphenol, 2 - ethylhexylphenol, nonylphenol, decylphenol, dodecylphenol, and the like. It is generally preferred, but not essential, that the alkyl substituent be linked to the para carbon atom of the parent phenolic nucleus. However, novolac resins in which the alykyl group is in the ortho position have been prepared.

The epoxidized novolac resin is formed in the well-known manner by adding the novolac resins to the epichlorohydrin and then adding an alkali metal hydroxide to the mixture so as to effect the desired condensation reaction.

In addition, other epoxy resins which may be used in the hardenable compositions of the present invention are epoxidized olefins, such as epoxidized polybutadiene and epoxidized cyclohexenes, and the diglycidyl ethers of the polyalkylene glycols. These latter ethers are readily available commercially and may be represented by the following theoretical, idealized formula:

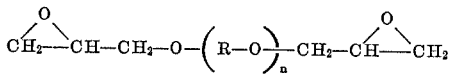

where R is an alkylene radical having from 2–5 carbon atoms and $n$ is an integer of from about 1 to about 50. R is preferably ethylene or propylene or mixtures thereof and $n$ is preferably about 3 to about 10. It is understood that $n$ represents an average figure since the ethers are often prepared from a mixture of glycols—i.e., tripropylene, glycol, tetrapropylene glycol, and the like. Said epoxy resins may be prepared in the manner set forth in U.S. Patent 2,923,696.

In general, the epoxy resins may be described as those having terminal epoxide groups, or at least as having more than one epoxide group per molecule, i.e., having a plurality of 1,2-epoxide groups.

In addition, the epoxy resins may be characterized further by reference to their epoxy equivalent weight, the epoxy equivalent weight of pure epoxy resin being the mean molecular weight of the resins divided by the mean number of epoxy radicals per molecule, or in any case, the number of grams of epoxy equivalent to one epoxy group or one gram equivalent of epoxide. The epoxy resinous materials employed in this invention have epoxy equivalent weights of from about 140 to about 2000.

The described polyamine derivatives are used in an amount sufficient to cure the epoxy resin to an insoluble and infusible polymer. Ideally the amount of the polyamine derivative curing agent would be sufficient to provide about one primary amino group for two epoxy groups in the resin, in accordance with the general theory that the cross-linking reaction proceeds predominantly through the primary amine group. In actual practice, however, such factors as stearic hindrance, self cross-linking of the epoxy and the like preclude reaction of every epoxy group and every primary amine group in many cases. The weight ratios preferred for use in the practice of the instant invention on the basis of (1) epoxy resin to (2) polyamine derivative may range from about 95:5 to 50:50. It will be understood that the relative proportions of (1):(2) relate to the hardenable components of the composition and suitable conventional additives such as pigments, fillers, flow control agents, accelerators, solvents and the like may be incorporated in the compositions.

The infusible, insoluble resinous compositions of our invention are prepared from the described hardenable compositions by exposing the same to moisture. The curing rate can be increased or decreased by varying the temperature and/or relative humidity. Water may be added to the hardenable composition to give quicker activation. The hardenable compositions are preferably exposed to atmospheres containing relative humidities of 25 to 90%. Curing temperatures of 25–450° F. are preferred.

It is understood that the atmpospheric moisture or water hydrolyzes or unblocks the ketimine blocked primary amine groups of the derivatives. The freed primary amine groups thus enter into the reaction with the epoxy resin. In the complete absence of moisture, the hardenable compositions are, accordingly stable for long periods of time.

The following examples illustrate certain preferred embodiments of the invention and are not to be considered as limiting. All parts are by weight unless otherwise indicated.

EXAMPLE I

Five parts of the derivative as prepared in Example B, 25 parts of an epoxy resin and 10 parts of a solvent were blended to yield a hardenable composition. The epoxy resin was a glycidyl ether having an epoxy equivalent weight of about 525 prepared by condensing Bisphenol A and epichlorohydrin. The solvent consisted of methyl isobutyl ketone and xylol (1:1 volume ratio). This composition after 1 day (at 73° F. and in an atmosphere substantially free from moisture) had a Gardner Holdt viscosity of E. After 3 days, the viscosity was Q indicating that the pot life of the curable composition is relatively long. The composition was then used to coat glass and tinplate (1.5 mil films) and the coated substrates were cured at 73° F. and 50% relative humidity. The coating on glass had a Sward hardness of 37 after 7 days. The coating on tinplate had an extensibility of 60+% after 4 days. Solvent resistance of the coatings were also measured by immersing the coated substrates in various solvents for 24 hours and then examining the coatings to see whether they remained hard, were slightly softened or the like. The acid tests were carried out on the coated glass; the remaining tests on the coated tinplate. The coatings remained hard in 37% $H_2SO_4$, 20% NaOH, water, mineral spirits and aviation gas. The coatings were softened by 5% acetic acid, were slightly softened by Skydrol 500 hydraulic fluid and were wrinkled by oleic acid.

EXAMPLE II

Example I was repeated using 6.4 parts of the derivative of Example B, 25 parts of the epoxy resin and 11.4 parts of the solvent. The resulting curable composition had substantially the same fine properties as the composition of Example I, the only difference being that the Sward hardness was 35 and 5% acetic acid loosened the coating on the glass substrate.

The data of the above examples show that the hardenable compositions have a desirably long pot life and yet will cure in relatively short periods of time at ambient temperatures and in the presence of moisture to yield coatings which are tough, hard, flexible and have good solvent resistance to many of the commonly encountered solvents. Other hardenable compositions of the invention provide other advantages. Thus the properties of the cured resin systems can be tailored by selection of the particular polyamine and carboxylic acid moiety introduced into the derivative. Our compositions are useful in the preparation of coatings, adhesives, laminates, castings and the like.

It is to be understood that the invention is not to be limited to the exact details of operation or the exact compositions shown or described, as obvious modifications and equivalents will be apparent to those skilled in the art and the invention is to be limited only by the scope of the appended claims.

The embodiments of the invention in which an exclusive property or privilege is claimed are defined as follows:

1. A hardenable composition comprising a mixture of of (1) an epoxy resin having a plurality of 1,2-epoxide groups and (2) a derivative of (a) an amine having at least one free secondary amine group and at least two primary amine groups, the said primary amine groups being blocked by ketimine groups, and (b) a carboxylic acid compound selected from the group consisting of carboxylic acids and anhydrides, esters and acid halides of carboxylic acids, said derivatives having been prepared by reacting the polyamine with the carboxylic acid compound under amide forming conditions to form an amide linkage from the secondary amine group and the carboxylic acid compound.

2. The composition of claim 1 wherein the epoxy resin is a glycidyl ether of a polyhydric phenol.

3. The composition of claim 1 wherein the epoxy resin has an epoxy equivalent weight of from about 140 to about 2000.

4. The composition of claim 1 wherein the amine is an alkylene polyamine having two primary amine groups, the said primary amine groups being blocked by ketimine groups.

5. The composition of claim 4 wherein the alkylene group of the polyamine contains 2 to about 6 carbon atoms.

6. The composition of claim 5 wherein the alkylene polyamine contains one free secondary amine group.

7. The composition of claim 1 wherein the amine has the formula:

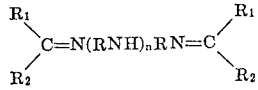

where R is a difunctional aliphatic group containing from 2 to about 48 carbon atoms, $n$ is an integer of 1 to about 20, and $R_1$ and $R_2$ are organic radicals.

8. The composition of claim 7 wherein $R_1$ and $R_2$ are alkyl radicals of 1 to 4 carbon atoms.

9. The composition of claim 1 wherein the carboxylic acid compound contains 1 to 40 carbon atoms.

10. The composition of claim 9 wherein the carboxylic acid compound is a dicarboxylic acid.

11. The composition of claim 1 wherein the derivative has the formula

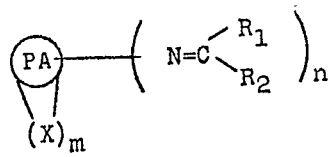

wherein $R_1$ and $R_2$ are organic radicals, $n$ is an integer of at least 2, $m$ is an integer of at least 1, $>X$ is

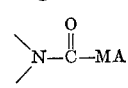

where MA is the residue of a monocarboxylic acid and

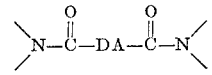

is the residue of the polyamine exclusive of the ketimine blocked primary amine groups and the amide linked secondary amine nitrogen.

12. The composition of claim 1 wherein the derivative has the formula

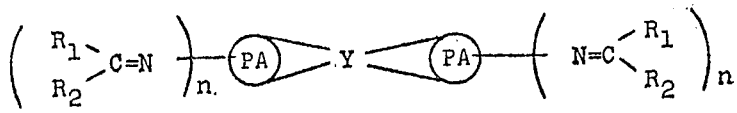

wherein $R_1$ and $R_2$ are organic radicals, $n$ is an integer of at least 2, $>Y<$ is

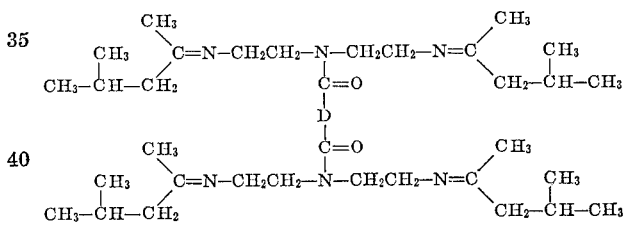

where DA is the residue of a dicarboxylic acid and

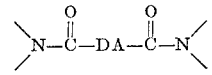

is the residue of the polyamine exclusive of the ketimine blocked primary amine groups and the amide linked secondary amine nitrogen.

13. The composition of claim 1 wherein the epoxy resin is a glycidyl ether of 2,2-bis(p-hydroxyphenyl) propane having an epoxy equivalent weight of about 525 and the derivative has the formula $$\begin{array}{cc} CH_3 & CH_3 \\ CH_3 \diagdown C=N-CH_2CH_2-N-CH_2CH_2-N=C \diagup CH_3 \\ CH_3-CH-CH_2 \quad C=O \quad CH_2-CH-CH_3 \\ D \\ CH_3 \quad C=O \quad CH_3 \\ CH_3 \diagdown C=N-CH_2CH_2-N-CH_2CH_2-N=C \diagup CH_3 \\ CH_3-CH-CH_2 \quad\quad\quad CH_2-CH-CH_3 \end{array}$$

where D is the divalent hydrocarbon radical of a mixture of dimerized linoleic and oleic acids, said derivative being used in an amount sufficient to cure the epoxy resin to an infusible, insoluble polymer.

14. An infusible, insoluble resinous product formed by curing the composition of claim 1 in the presence of moisture.

15. An infusible, insoluble resinous product formed by curing the composition of claim 11 in the presence of moisture.

16. An infusible, insoluble resinous product formed by curing the composition of claim 12 in the presence of moisture.

17. An infusible, insoluble resinous product formed by curing the composition of claim 13 in the presence of moisture.

References Cited

UNITED STATES PATENTS 3,322,797  5/1967  Holm _____ 260—47

WILLIAM H. SHORT, *Primary Examiner.*

T. D. KERWIN, *Assistant Examiner.*